(12) United States Patent  (10) Patent No.: US 8,719,865 B2
Moonka et al.  (45) Date of Patent: May 6, 2014

(54) USING VIEWING SIGNALS IN TARGETED VIDEO ADVERTISING

(75) Inventors: Rajas Moonka, San Ramon, CA (US); Peter C. Chane, Palo Alto, CA (US); Manish Gupta, Santa Clara, CA (US); Nicholas Lee, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/111,857

(22) Filed: May 19, 2011

(65) Prior Publication Data

US 2011/0289531 A1 Nov. 24, 2011

Related U.S. Application Data

(63) Continuation of application No. 11/550,388, filed on Oct. 17, 2006, now abandoned.

(60) Provisional application No. 60/844,189, filed on Sep. 12, 2006.

(51) Int. Cl.
*G06F 3/00* (2006.01)

(52) U.S. Cl.
USPC .......................................................... 725/42

(58) Field of Classification Search
USPC ........................................ 725/38, 42; 705/37
See application file for complete search history.

(56) References Cited

U.S. PATENT DOCUMENTS

| | | |
|---|---|---|
| 5,649,060 A | 7/1997 | Ellozy |
| 5,664,227 A | 9/1997 | Mauldin et al. |
| 5,724,521 A | 3/1998 | Dedrick |
| 5,740,549 A | 4/1998 | Reilly et al. |
| 5,848,397 A | 12/1998 | Marsh et al. |
| 5,948,061 A | 9/1999 | Merriman et al. |
| 6,026,368 A | 2/2000 | Brown et al. |
| 6,044,376 A | 3/2000 | Kurtzman |
| 6,078,914 A | 6/2000 | Redfern |
| 6,091,416 A | 7/2000 | Cragun |
| 6,144,944 A | 11/2000 | Kurtzman et al. |
| 6,167,382 A | 12/2000 | Sparks et al. |
| 6,188,398 B1 | 2/2001 | Collins et al. |
| 6,269,361 B1 | 7/2001 | Davis et al. |
| 6,282,548 B1 | 8/2001 | Burner et al. |
| 6,282,713 B1 | 8/2001 | Kitsukawa et al. |

(Continued)

FOREIGN PATENT DOCUMENTS

| | | |
|---|---|---|
| CN | 102113009 A | 6/2011 |
| JP | 2003242372 A | 8/2003 |

(Continued)

OTHER PUBLICATIONS

Ana Viets, Supplementary EP Search Report in PCT/US2009/052866, mailed Nov. 3, 2011, 5 pages.

(Continued)

*Primary Examiner* — Nathan Flynn
*Assistant Examiner* — Alfonso Castro
(74) *Attorney, Agent, or Firm* — Fish & Richardson P.C.

(57) ABSTRACT

At a client, a video is received. The video includes one or more advertisement slots. The video is played back to a user. During the playback of the video, an impending advertisement slot is detected. One or more advertisements are requested for placement in the advertisement slot. The one or more advertisements are received and placed in the advertisement slot.

17 Claims, 12 Drawing Sheets

(56) References Cited

U.S. PATENT DOCUMENTS

| | | |
|---|---|---|
| 6,393,158 B1 | 5/2002 | Gould et al. |
| 6,401,075 B1 | 6/2002 | Mason et al. |
| 6,615,270 B2 | 9/2003 | Gould et al. |
| 6,621,980 B1 | 9/2003 | Gould et al. |
| 6,698,020 B1 | 2/2004 | Zigmond et al. |
| 6,771,290 B1 | 8/2004 | Hoyle |
| 6,847,977 B2 | 1/2005 | Abajian |
| 6,978,470 B2 | 12/2005 | Swix et al. |
| 6,985,882 B1 | 1/2006 | Del |
| 6,990,496 B1 | 1/2006 | McGee et al. |
| 6,996,564 B2 | 2/2006 | Lester et al. |
| 7,039,599 B2 | 5/2006 | Merriman et al. |
| 7,043,746 B2 | 5/2006 | Ma |
| 7,055,103 B2 | 5/2006 | Lif |
| 7,058,963 B2 * | 6/2006 | Kendall et al. .................. 725/21 |
| 7,136,875 B2 | 11/2006 | Anderson et al. |
| 7,158,966 B2 | 1/2007 | Brill et al. |
| 7,158,986 B1 | 1/2007 | Oliver et al. |
| 7,165,069 B1 | 1/2007 | Kahle et al. |
| 7,181,447 B2 | 2/2007 | Curtis et al. |
| 7,194,527 B2 | 3/2007 | Drucker et al. |
| 7,266,198 B2 | 9/2007 | Medvinsky |
| 7,383,258 B2 | 6/2008 | Harik et al. |
| 7,454,509 B2 | 11/2008 | Boulter et al. |
| 7,467,218 B2 | 12/2008 | Gould et al. |
| 7,506,356 B2 | 3/2009 | Gupta et al. |
| 7,559,017 B2 | 7/2009 | Datar et al. |
| 7,584,490 B1 | 9/2009 | Schlack |
| 7,657,519 B2 | 2/2010 | Anderson et al. |
| 7,769,819 B2 | 8/2010 | Lerman et al. |
| 7,806,329 B2 | 10/2010 | Dmitriev et al. |
| 7,809,802 B2 | 10/2010 | Lerman et al. |
| 7,853,601 B2 | 12/2010 | Kadambi et al. |
| 7,966,632 B1 | 6/2011 | Pan et al. |
| 7,986,372 B2 | 7/2011 | Ma et al. |
| 8,156,010 B2 | 4/2012 | Gopalakrishnan |
| 8,156,176 B2 | 4/2012 | Lerman et al. |
| 8,196,166 B2 | 6/2012 | Roberts et al. |
| 8,243,017 B2 | 8/2012 | Brodersen et al. |
| 2001/0003214 A1 | 6/2001 | Shastri et al. |
| 2002/0002525 A1 * | 1/2002 | Arai et al. ........................ 705/37 |
| 2002/0116716 A1 | 8/2002 | Sideman |
| 2002/0147782 A1 | 10/2002 | Dimitrova et al. |
| 2002/0194195 A1 | 12/2002 | Fenton et al. |
| 2003/0046161 A1 * | 3/2003 | Kamangar et al. .............. 705/14 |
| 2003/0061305 A1 | 3/2003 | Copley et al. |
| 2003/0154128 A1 * | 8/2003 | Liga et al. ........................ 705/14 |
| 2003/0188308 A1 | 10/2003 | Kizuka |
| 2004/0059708 A1 | 3/2004 | Dean et al. |
| 2004/0133910 A1 | 7/2004 | Gordon et al. |
| 2004/0163101 A1 | 8/2004 | Swix et al. |
| 2004/0226038 A1 | 11/2004 | Choi |
| 2004/0267806 A1 * | 12/2004 | Lester ....................... 707/103 R |
| 2005/0028190 A1 | 2/2005 | Rodriguez et al. |
| 2005/0034151 A1 | 2/2005 | Abramson |
| 2005/0071224 A1 | 3/2005 | Fikes et al. |
| 2005/0091311 A1 | 4/2005 | Lund et al. |
| 2005/0114198 A1 | 5/2005 | Koningstein et al. |
| 2005/0120127 A1 | 6/2005 | Bradley et al. |
| 2005/0207442 A1 | 9/2005 | Zoest et al. |
| 2006/0013555 A1 | 1/2006 | Poslinski |
| 2006/0015904 A1 | 1/2006 | Marcus |
| 2006/0026628 A1 | 2/2006 | Wan et al. |
| 2006/0053470 A1 | 3/2006 | Colter et al. |
| 2006/0059510 A1 | 3/2006 | Huang et al. |
| 2006/0090182 A1 | 4/2006 | Horowitz et al. |
| 2006/0106709 A1 * | 5/2006 | Chickering et al. ............ 705/37 |
| 2006/0129533 A1 | 6/2006 | Purvis |
| 2006/0140584 A1 | 6/2006 | Ellis et al. |
| 2006/0179453 A1 | 8/2006 | Kadie et al. |
| 2006/0214947 A1 | 9/2006 | Boose et al. |
| 2006/0221222 A1 | 10/2006 | Hirasawa |
| 2006/0224496 A1 | 10/2006 | Sandholm et al. |
| 2006/0224693 A1 | 10/2006 | Gaidemak et al. |
| 2006/0247998 A1 | 11/2006 | Gopalakrishnan |
| 2006/0259588 A1 | 11/2006 | Lerman et al. |
| 2006/0259589 A1 | 11/2006 | Lerman et al. |
| 2006/0271977 A1 | 11/2006 | Lerman et al. |
| 2006/0277567 A1 | 12/2006 | Kinnear |
| 2007/0073579 A1 * | 3/2007 | Immorlica et al. .............. 705/14 |
| 2007/0078708 A1 | 4/2007 | Yu et al. |
| 2007/0078709 A1 | 4/2007 | Rajaram |
| 2007/0089127 A1 | 4/2007 | Flickinger et al. |
| 2007/0100690 A1 | 5/2007 | Hopkins |
| 2007/0101365 A1 | 5/2007 | Clark et al. |
| 2007/0112630 A1 | 5/2007 | Lau et al. |
| 2007/0113240 A1 * | 5/2007 | McLean et al. ................... 725/8 |
| 2007/0130602 A1 | 6/2007 | Gulli et al. |
| 2007/0146549 A1 | 6/2007 | Suh |
| 2007/0157228 A1 | 7/2007 | Bayer et al. |
| 2007/0159522 A1 | 7/2007 | Neven |
| 2007/0204310 A1 | 8/2007 | Hua et al. |
| 2007/0245242 A1 | 10/2007 | Yagnik |
| 2007/0277205 A1 | 11/2007 | Grannan |
| 2007/0282893 A1 | 12/2007 | Smith et al. |
| 2007/0282906 A1 | 12/2007 | Gabriel |
| 2007/0288950 A1 | 12/2007 | Downey et al. |
| 2007/0299870 A1 | 12/2007 | Finch |
| 2008/0004948 A1 * | 1/2008 | Flake et al. ..................... 705/14 |
| 2008/0005166 A1 | 1/2008 | Cragun et al. |
| 2008/0019610 A1 | 1/2008 | Matsuzaka et al. |
| 2008/0021775 A1 | 1/2008 | Lerman et al. |
| 2008/0027798 A1 | 1/2008 | Ramamurthi et al. |
| 2008/0033806 A1 | 2/2008 | Howe et al. |
| 2008/0066107 A1 | 3/2008 | Moonka et al. |
| 2008/0092159 A1 | 4/2008 | Dmitriev et al. |
| 2008/0092182 A1 | 4/2008 | Conant |
| 2008/0098420 A1 | 4/2008 | Khivesara et al. |
| 2008/0154908 A1 | 6/2008 | Datar et al. |
| 2008/0155585 A1 | 6/2008 | Craner et al. |
| 2008/0155588 A1 | 6/2008 | Roberts et al. |
| 2008/0163071 A1 | 7/2008 | Abbott et al. |
| 2008/0189169 A1 | 8/2008 | Turpin et al. |
| 2008/0201361 A1 | 8/2008 | Castro et al. |
| 2008/0229353 A1 | 9/2008 | Morris et al. |
| 2008/0235722 A1 | 9/2008 | Baugher et al. |
| 2008/0249855 A1 | 10/2008 | Collins et al. |
| 2008/0263583 A1 | 10/2008 | Heath |
| 2008/0276266 A1 | 11/2008 | Huchital et al. |
| 2008/0300974 A1 | 12/2008 | Bhandari et al. |
| 2008/0306999 A1 | 12/2008 | Finger et al. |
| 2009/0006375 A1 | 1/2009 | Lax et al. |
| 2009/0049469 A1 | 2/2009 | Small et al. |
| 2009/0055375 A1 | 2/2009 | Oestlien et al. |
| 2009/0070836 A1 | 3/2009 | Aaby et al. |
| 2009/0132507 A1 | 5/2009 | Kadambi et al. |
| 2009/0165041 A1 | 6/2009 | Penberthy et al. |
| 2010/0037149 A1 | 2/2010 | Heath |
| 2010/0174607 A1 | 7/2010 | Henkin et al. |
| 2010/0186028 A1 | 7/2010 | Moore et al. |
| 2010/0278453 A1 | 11/2010 | King |
| 2011/0131595 A1 | 6/2011 | Xue et al. |
| 2013/0254802 A1 | 9/2013 | Lax et al. |

FOREIGN PATENT DOCUMENTS

| | | |
|---|---|---|
| JP | 2006 155384 | 6/2006 |
| KR | 10 2006 0099253 | 9/2006 |
| WO | 97 21183 | 6/1997 |
| WO | WO9936918 | 7/1999 |
| WO | 99 66719 | 12/1999 |
| WO | 01 50296 | 7/2001 |
| WO | 03 084219 | 10/2003 |
| WO | 2006 111912 | 10/2006 |
| WO | 2008 072874 | 6/2008 |

OTHER PUBLICATIONS

AdForce, Inc., A Complete Guide to AdForce, Version 2.6, 1998.
AdForce, Inc., S-1/A SEC filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.

(56) References Cited

OTHER PUBLICATIONS

Ad-Star.com website archive from www.Archive.org., Apr. 12, 1997, and Feb. 1, 1997.
Baseview Products, Inc., ClassManagerPro Administration Manual v. 1.0.5, Feb. 1, 1997.
Baseview Products, Inc., AdManagerPro Administration Manual v. 2.0, Dec. 1998.
Business Wire, "Global Network, Inc. Enters into Agreement in Principle with Major Advertising Agency," Oct. 4, 1999.
Dedrick, R., "Interactive Electronic Advertising," IEEE, 1994.
Dedrick, R., "A Consumption Model for Targeting Electronic Advertising," Intel Architecture Labs, IEEE, 1995.
Information Access Technologies, Inc., Aaddzz brochure, "The Best Way to Buy and Sell Web Advertising Space," 1997.
Information Access Technologies, Inc., Aaddzz.com website archive from www.Archive.org, archived on Jan. 30, 1998.
International Search Report and Written Opinion from corresponding International Application No. PCT/US2008/060859, dated Sep. 26, 2008.
International Search Report and Written Opinion from corresponding International Application No. PCT/US2007/078299, dated Feb. 5, 2008.
International Preliminary Report on Patentability from corresponding International Application No. PCT/US2007/078299, dated Mar. 17, 2009.
International Preliminary Report on Patentability from corresponding International Application No. PCT/US2008/060859, dated Oct. 20, 2009, 6 pages.
International Search Report and Written Opinion from corresponding International Application No. PCT/US2009/052866, dated Mar. 18, 2010, 11 pages.
Request for Reexamination of U.S. Patent No. 6,446,045 B1, Control No. 95/001,061.
Request for Reexamination of U.S. Patent No. 6.829,587 B2, Control No. 95/001,068.
Request for Reexamination of U.S. Patent No. 7,240,025 B2, Control No. 95/001,073.
Request for Reexamination of U.S. Patent No. 7,249,059 B2, Control No. 95/001,069.
Sandoval, G. "YouTube: Too rough for advertisers?" Internet article, http://www.news.com; Apr. 21, 2006.
Zeff, R., et al. "Advertising on the Internet," 2nd Ed., John Wiley & Sons, 1999.
Lowe, D.G., "Object Recognition from Local Scale-Invariant Features," Proc. Seventh IEEE Int'l Conf on Computer Vision ICCV 99, Kerkyra, Greece, Sep. 20-27, 1999, pp. 1150-1157.
Authorized officer Simin Baharlou, International Preliminary Report on Patentability in PCT/US2009/052866, mailed Feb. 17, 2011, 7 pages.
Supplementary EP Search Report in EP 08 74 6298, mailed Jan. 23, 2012, 7 pages.
Chinese Office Action in Chinese Application No. 200980130845.X, dated Dec. 27, 2011, 17 pages.
Masashi Honda, International Preliminary Report on Patentability in PCT/US2008/060859, mailed Oct. 29, 2009, 6 pages.
International Preliminary Report on Patentability for PCT Application No. PCT/US2008/068624, dated Jan. 14, 2010, 6 pages.
JP Office Action (Notice of Reasons for Rejection) in Application No. 2009-528455, dated Aug. 13, 2012, 6 pages.
Communication pursuant to Article 94(3) EPC for EP Appl. No. EP 07 842 355.5-1502 dated Mar. 14, 2013, 3 pages.
EP Communication from European Application No. 08781112.1 mailed Oct. 26, 2010, 4 pages.
European Search Report issued in international application No. 08756776.4 on Apr. 20, 2001, 3 pages.
Communication Pursuant to Article 94(3) EPC issued in international application No. 08756776.4 on Apr. 29, 2011, 7 pages.
PCT International Search Report and Written Opinion, PCT/US2008/062442, Jul. 14, 2008, 10 pages.

PCT International Search Report and Written Opinion, PCT/US2008/062103, Aug. 26, 2008, 10 pages.
International Search Report and Written Opinion for PCT Application No. PCT/US2008/068624, dated Aug. 4, 2009, 12 pages.
International Preliminary Report on Patentability issued in international application No. PCT/US2008/062103 on Nov. 3, 2009, 6 pages.
International Preliminary Report on Patentability issued in international application No. PCT/US2008/062442 on Nov. 3, 2009, 7 pages.
International Preliminary Report on Patentability issued in international application No. PCT/US2008/066175 on Dec. 11, 2009, 7 pages.
Baluja et al. "Video Suggestion and Discovery for YouTube: Taking Random Walks through the View Graph", ACM, WW 2008, Apr. 21-25, 2008, 10 pages.
Greg Sandoval: "YouTube: Too rough for advertisers?" [online] [retrieved on Apr. 21, 2006]. Retrieved from the Internet: < URL: http://www.news.com >, 1 page.
International Preliminary Report on Patentability for PCT Application No. PCT/US2008/066175, mailed Dec. 23, 2009, 7 pgs.
International Search Report and Written Opinion from International Application No. PCT/US08/66175, mailed Jun. 9, 2009, 8 pgs.
International Preliminary Report on Patentability from International Application No. PCT/US2008/073914, mailed Mar. 4, 2010, 7 pgs.
International Search Report and Written Opinion from International Application No. PCT/US2008/073914 mailed Jun. 23, 2009, 14 pgs.
Chinese Office Action in Chinese Application No. 200980130845.X, dated Dec. 27, 2011, 4 pages.
PC World, Steve Bass's Tips & Tweaks., http//blogs.pcworld.com/tipsandtweaks/archives/006418/html, downloaded Feb. 14, 2011, 2 pages.
"Ad Serving with RealSystem™ G2," RealNetworks, 1999, 38 pages, [online] [Retrieved on Feb. 13, 2009] Retrieved from the internet <URL:http://service.real.com/help/library/blueprints/adserve/adserve.htm>.
"www.Scanscout.com," 2 pages, Archived on Apr. 7, 2007 on web.archive.org [online][Tretived on Oct. 19, 2009] Retrived from the internet: <URL:http://web.archive.org/web/20070407233129/http://www.scanscout.com/>.
"www.BrightRoll.com," 2 pages, Archived on Apr. 29, 2007 on web.archive.org [online][Retrieved on Oct. 19, 2009] Retrieved from the internet: <URL:http://web.archive.org/web/20070429110654/http://www.birghtroll.com/>.
Ajax Activity Indicators, Archived on Dec. 25, 2006 on www.web.archive.org [online] [Retrieved on Jun. 10, 2008] Retrieved from the internet URL: http://web.archive.org/web/20061225134638/http://www/napyfab. com/ajax-indicators/, 1 page.
Strange, Adario, "VideoEgg Exec: YouTube's New Ads are Just Like Ours," [online], [Retrieved Jun. 2008, pp. 1-8,] Retrieved from the internet <URL://http://blog.wired.com/business/2007/08/network-wars-vi.html>.
"Overlay & Video AdType," ScanScout, 2007, [online] [Retrieved on Jul. 15, 2008] Retrieved from the internet URL://demo.scanscount.com/livedemo.shtml?adType=overlay&videoAdType=rightSide &ss . . . , 1 page.
Riley, D., "Contextual In-Video Advertising: ScanScout," May 14, 2007, [online] [Retrieved on Jul. 15, 2008] Retrieved from the internet URL://www.techcrunch.com/2007/05/14/contextual-in-video-advertising-scanscout/., 5 pages.
Delaney, Kevin J., "Start-Ups See to Cash in on Web-Video Ads", Wall Street Journal, Mar. 2, 2007,[online] [Retrieved Sep. 3, 2008] Retrieved from the internet URL://www.scanscout.com/wsj-070302.html], 4 pages.
"www.YuMe.com," 2009, 1 Page, [online][Retrieved on Oct. 19, 2009] Retrieved from the internet: <URL:http://www.yume.com/>.
U.S. Appl. No. 11/438,473, filed May 22, 2006, Estimating Video Ad Performance, Moonka et al.
U.S. Appl. No. 12/028,710, filed Feb. 8, 2008, User Interaction Based Related Videos, He et al.
U.S. Appl. No. 12/029,140, filed Feb. 11, 2008, Associating Advertisements with Videos, Seth et al.

(56) References Cited

OTHER PUBLICATIONS

U.S. Appl. No. 12/637,635, filed Dec. 14, 2009, Target-Video Specific Co-Watched Video Clusters, He et al.

U.S. Appl. No. 13/620,191, filed Sep. 14, 2012, Content Recognition for Targeting Video Advertisements, Heath.

* cited by examiner

USING VIEWING SIGNALS IN TARGETED VIDEO ADVERTISING

RELATED APPLICATIONS

This application is a continuation of pending U.S. application Ser. No. 11/550,388, entitled "Using View Signals in Targeted Video Advertising", filed on Oct. 17, 2006, which claims priority under 35 U.S.C. §119(e) to U.S. Provisional Application Ser. No. 60/844,189, entitled "Using Viewing Signals Captured in Video Ad-Auction," filed Sep. 12, 2006. The entire disclosures of both of the prior applications are hereby incorporated by reference.

This application is related to the following U.S. patent applications, which are hereby incorporated by reference herein:

U.S. patent application Ser. No. 11/550,249, titled "Targeted Video Advertising," filed Oct. 17, 2006;

U.S. patent application Ser. No. 11/240,794, titled "Using Negative User Feedback Information, Such as Advertisement Close Rate, in Scoring and/or Pricing Online Advertisements," filed Sep. 30, 2006;

U.S. patent application Ser. No. 11/438,473, titled "Estimating Video Ad Performance," filed May 22, 2006; and U.S. patent application Ser. No. 11/241,834, titled, "Using Speech Recognition to Determine Advertisements Relevant to Audio Content and/or Audio Content Relevant to Advertisements," filed Sep. 30, 2005.

BACKGROUND

The subject matter of this application is generally related to advertising.

Online video is a growing medium. The popularity of online video services reflect this growth. Advertisers see online video as another way to reach their customers. A form of advertising which is of interest to advertisers is video ads that are played as part of the video stream, sometimes called "in-stream" video advertisements.

Today, most in-stream video ads are sold as flights against a certain number of available impressions (sometimes referred to as "avails"). The conventional advertisement viewing experience for video is largely pre-programmed without providing advertisers with any assurances that the users who view their videos are part of the audience targeted for the advertisement. Moreover, the conventional advertisement viewing experience fails to provide users with the ability to determine the kinds of advertising that they prefer to watch. In-stream video advertisements should be useful for users and not simply a way for advertisers to target users for advertisements.

SUMMARY

According to one aspect, a computer-implemented method includes generating a user interface including a display area for displaying video; displaying a video in the display area; and providing a control in the user interface, the control operable by a user to request a video advertising service associated with the video.

According to one aspect, a computer-implemented method includes receiving a video, determining one or more positions in the video, and adding an advertisement slot to the video at each determined position.

According to one aspect, a computer-implemented method includes receiving a video, mapping the video to one or more categories, and associating with the video one or more advertisements targeted to the one or more categories.

According to one aspect, a computer-implemented method includes providing one or more first video advertisements to a user, gathering interaction data regarding interactions with the first video advertisements by the user, and providing one or more second video advertisements to the user based at least on the interaction data.

According to one aspect, a computer-implemented method includes receiving a plurality of bids to provide a video advertisement for insertion into a video, each of the plurality of bids corresponding to a respective video advertisement; receiving user interaction data corresponding to a first one of the respective video advertisements; and modifying the respective bid corresponding to the first one of the respective video advertisements based on the user interaction data.

According to one aspect, a computer-implemented method includes, at a client, receiving a video, the video comprising one or more advertisement slots, and playing back the video to a user. The method also includes, during the playing: detecting an impending advertisement slot, requesting one or more advertisements for placement in the advertisement slot, receiving the one or more advertisements, and placing the one or more advertisements in the advertisement slot.

BRIEF DESCRIPTION OF THE DRAWINGS

Like reference numbers and designations in the various drawings indicate like elements.

DETAILED DESCRIPTION

Figure 1:
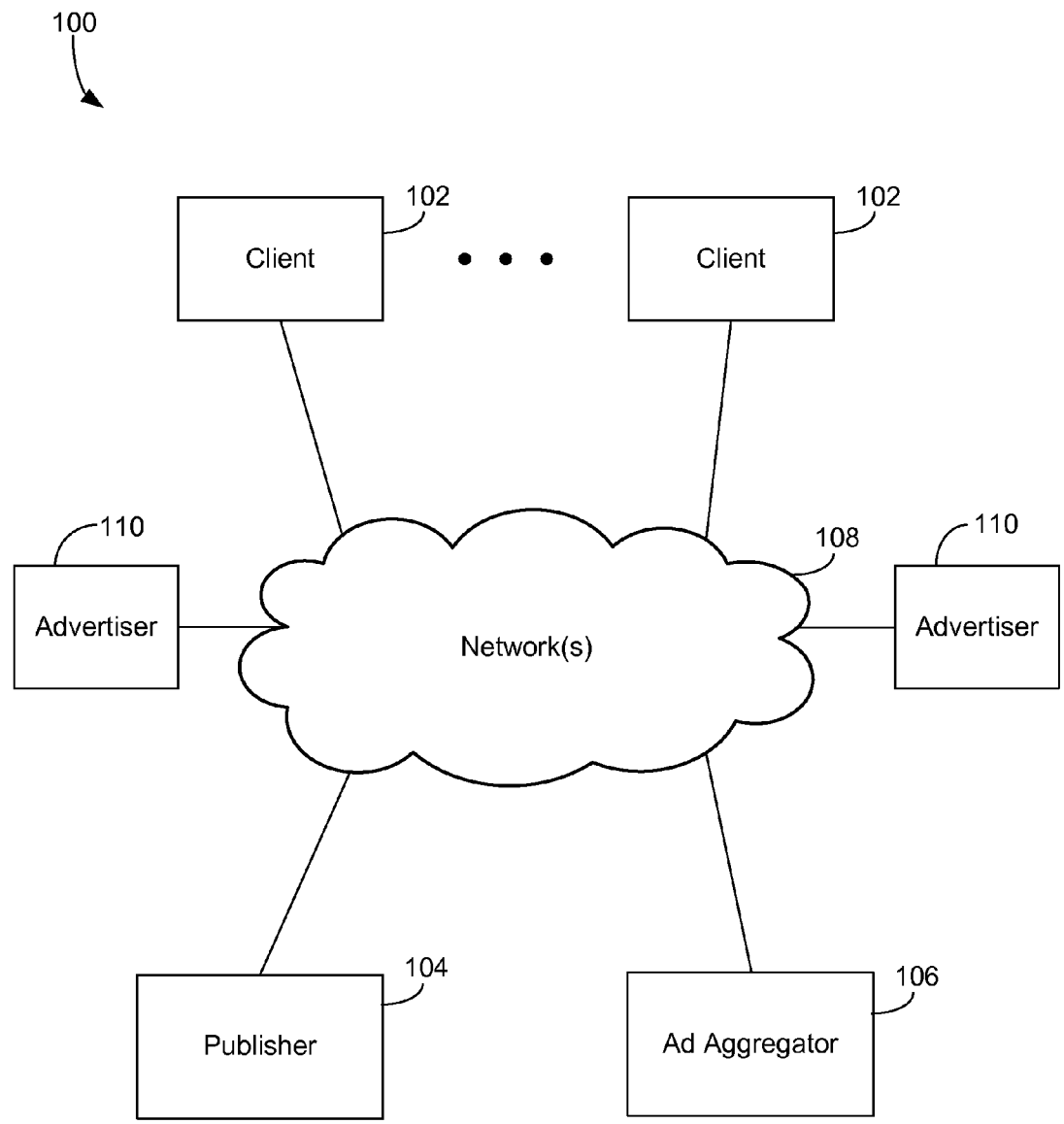
FIG. 1 is a block diagram of a computer network for targeting video advertisements in accordance with one implementation.

FIG. 1 is a block diagram of a computer network 100 for targeting video advertisements in accordance with one implementation. The computer network 100 includes one or more clients 102, a publisher 104, one or more advertisers 110, an ad aggregator 106, and one or more networks 108 for interconnecting these components. The one or more networks may include, without limitation, local area networks (LAN), wide-area networks (WAN), wired or wireless networks, the public Internet, etc.

The publisher 104 stores content and provides the content to clients 102. The content provided by the publisher 104 may include video content. Video content includes any content that can be visually perceived when played, decoded, or rendered. Video content may be stored or streamed. Video content may include, for example, a live or recorded television program, a live or recorded theatrical or dramatic work, a music video, a televised event (e.g., a sports event, a political event, a news event, etc.), video voice mail, etc. Video content can be compressed or uncompressed. Video content may work with various video and "container" file formats such as, for example, one or more of Macromedia's Flash Video (FLV), Microsoft's Advanced Streaming format (ASF), Windows Media Audio (WMA), Windows Media file with Audio/Video (WMV), Audio Video Interleave (AVI), DivX™, Intel Video Technology (IVF), Quick Time Movie File Extension (MOV), MPEG, Real Media, RealAudio, RealPlayer, Real Video, Vivo Video (VIV), OGG, Matroska, 3gp, NUT, MXF, ratDVD, svi, etc.

The ad aggregator 106 stores information associated with advertisements and provides tools to advertisers or sponsors for creating and managing advertising campaigns. An advertisement (or "ad") may be any content designed to promote a product or service, or to otherwise give public notice of some subject matter (e.g., a public service announcement, political advertising, a help wanted ad, etc.). An advertisement may include any combination of text, still graphics or images, moving graphics or images (e.g., video, animation), and audio. The advertisement may take on any of a variety of formats, such as a banner, a pop-up, an overlay over other content, a video, an audio recording, etc. The advertisement may be provided by an advertiser or sponsor 110. An advertiser 110 may access the ad aggregator 106 through network 108 to create an advertising campaign and control the placement of advertisements (e.g., by targeting to particular content or categories), bid for advertisement placements, monitor statistics associated with the advertising campaign, and make payments associated with the advertising campaign. In some implementations, the ad aggregator 106 also stores advertisements provided by the advertisers 110 as well.

The client 102 may be any device capable of receiving content, including but not limited to: personal computers, mobile phones, wireless devices, game consoles, tablets, media centers, consumer electronics, personal digital assistants, television systems, media players/recorders, music players, etc. The content that can be received by the client 102 may include documents such as web pages and video content. The video content may be played in a video player module or application. The video player module may be a standalone application, a plug-in to another application, or instructions downloaded from another computer or device. For example, in an exemplary implementation, the video player module is implemented using ADOBE FLASH. In another exemplary implementation, the video player module is implemented using JAVASCRIPT.

In some implementations, the video may be displayed within a web browser. For example, a web page may include an embedded video. The embedded video is referenced within the web page by the Universal Resource Locator (URL) of the video. When the web browser renders and displays the web page, a video player module is activated, retrieves the video from the URL, and plays the video within the displayed web page.

Advertisements may be targeted to video content and displayed with video content. In some implementations, video advertisements may be added to video content. When the video content is displayed at a client 102, the added video advertisements may be displayed as part of the displaying of the video content; the video advertisement is displayed in-stream with the video content. For example, one or more video advertisements may be shown in advertisement breaks or slots within a video. In some other implementations, ads may be displayed alongside, on top of, or otherwise in proximity to the video content. For example, a video may be displayed in one region of a user interface, and advertisements (e.g., text ads, banner ads) may be displayed in an adjacent region.

In some implementations, video advertisements provided by advertisers 110 are stored at a publisher 104. When an advertisement is requested by a client 102, as described below, the request is sent to an ad aggregator 106. The ad aggregator 106 determines the advertisement to be placed for the request. The ad aggregator 106 forwards instructions to the publisher 104 to deliver the advertisement, and the publisher 104 transmits the advertisement to the client 102 through network 108.

Displaying Videos and Video Advertisements

Figure 2:
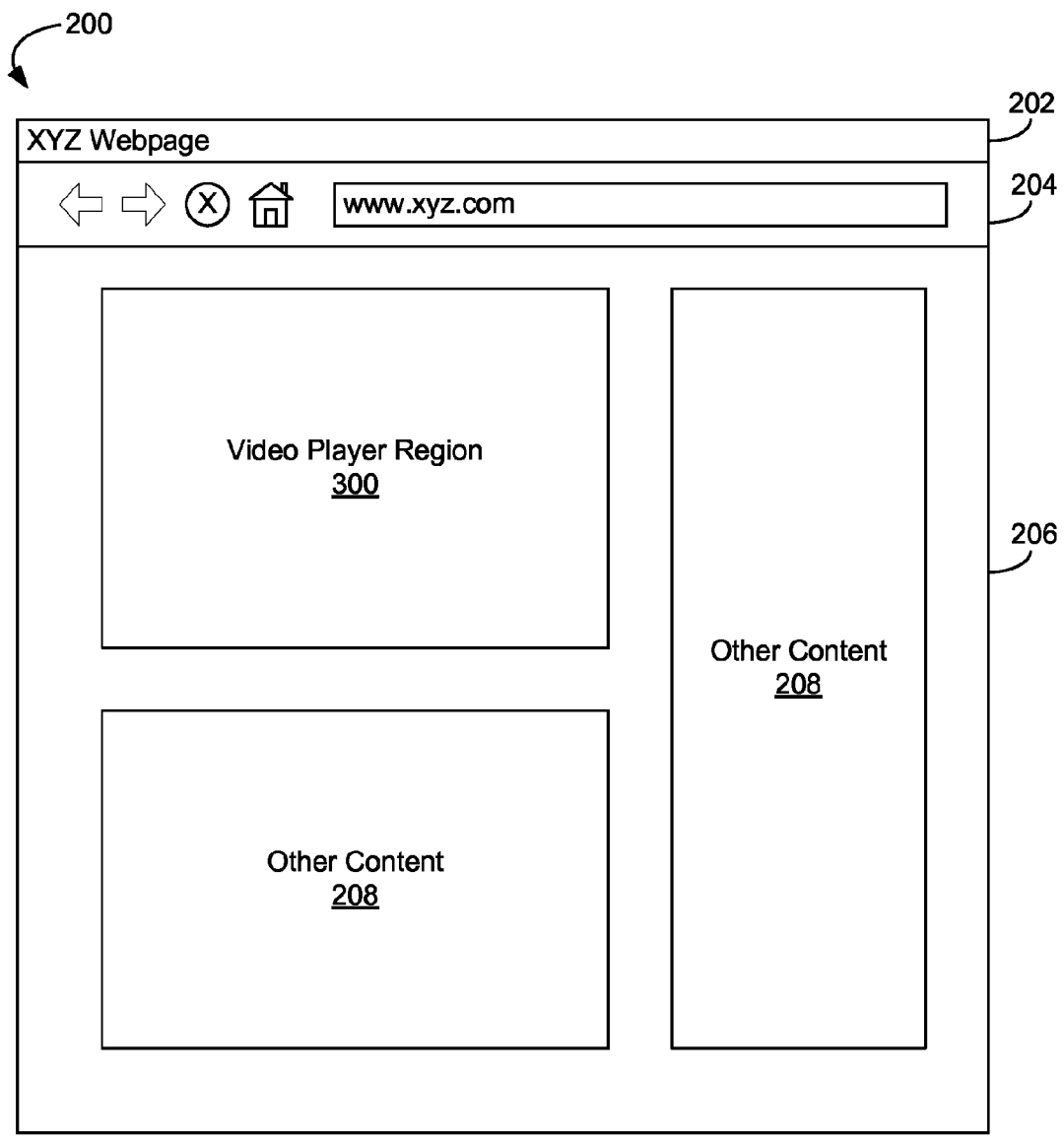
FIG. 2 is a diagram of a web browser user interface with a video player region in accordance with one implementation.

FIG. 2 is a diagram of a web browser user interface with a video player region in accordance with one implementation. The web browser user interface 200, which may be displayed at a client 102, includes a title bar 202, a navigation bar 204, and a content area 206. The title bar 202 displays information regarding the content displayed in the content area 206. In some implementations, the title bar 202 displays a title of the content displayed in the content area 206. The navigation bar 204 includes navigational controls for navigating between documents such as web pages. Exemplary navigation controls include back and forward, stop, and home controls. The navigation bar 204 may also include an address bar showing the Uniform Resource Locator (URL) of the content (e.g., web page) displayed in the content area 206.

Content may be displayed in the content area 206. In an exemplary implementation, the content is a web page. Whenever the content includes a video, a video player region 300 may be displayed in the content area 206. In some implementations, other content 208 may be displayed along with the video player region 300. The video player region 300 displays a user interface for viewing a video and controlling the viewing of the video. In one implementation, the other content 208 may include text, graphics, advertisements (e.g., text ads, graphics, links, banners), previews of videos (e.g., thumbnails of video frames), information about the displayed video, links, user-selectable controls, etc.

It should be appreciated that the web browser user interface is merely one exemplary interface for viewing videos. In some other implementations, a video player user interface may be displayed without a web browser interface. For example, a standalone video player application may include a video player user interface.

Figure 3A:
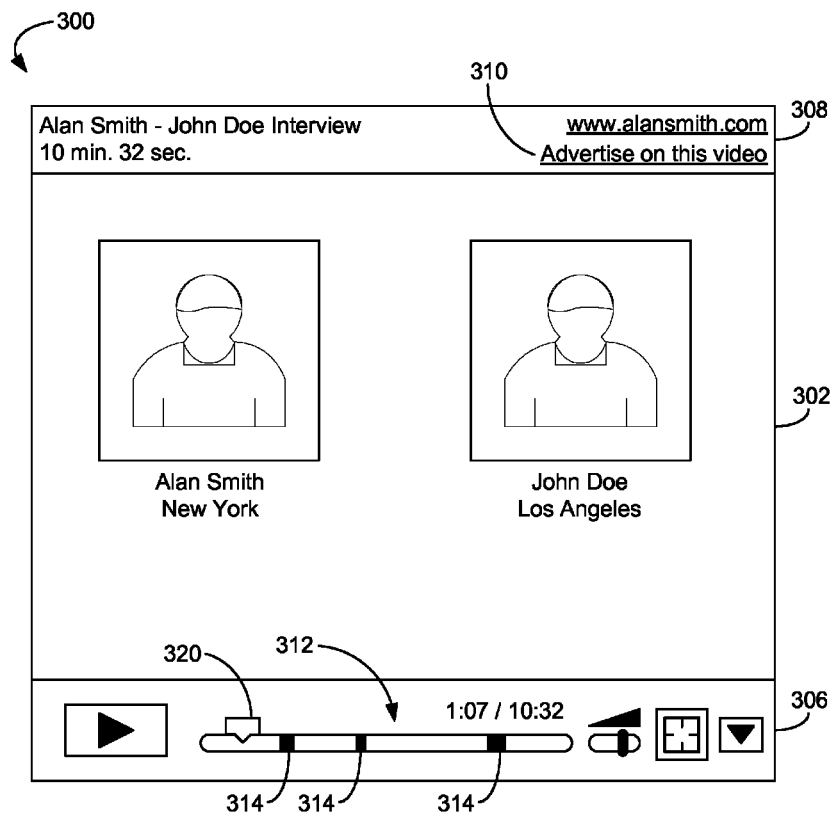
FIGS. 3A and 3B are diagrams of a video player region during playback of video content in accordance with one implementation.
Figure 3B:
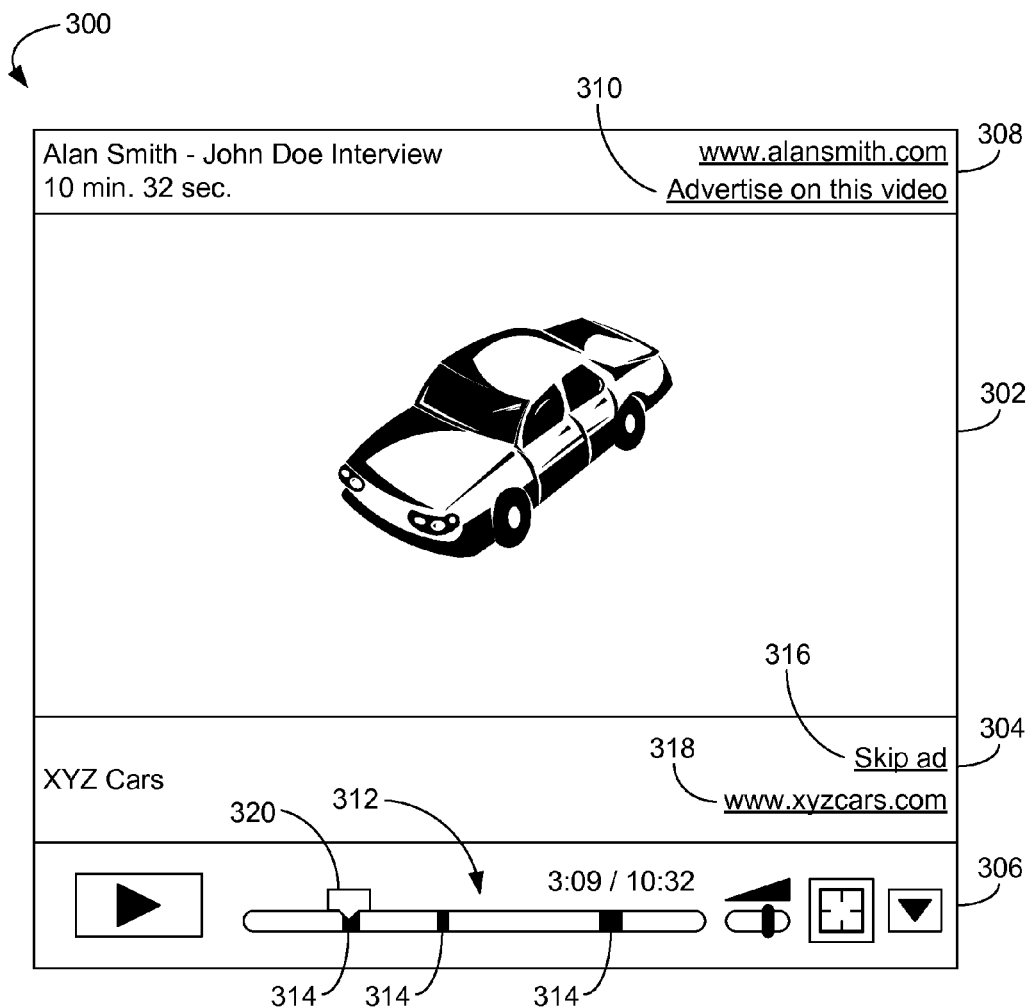

FIGS. 3A and 3B are diagrams of the video player region 300 during playback of video content in accordance with one implementation. The user interface of the video player region 300 includes an area 302 for displaying a video. The user interface of the video player region 300 also includes a video information portion 308 and a control portion 306. The information portion 308 provides information regarding the video being displayed. In some implementations, the information portion 308 includes a sign-up link or control 310. The sign-up control or link may include descriptive text such as "Advertise here" or "Advertise on this video." In some other implementations, the sign-up link or control 310 is displayed elsewhere in the video player region 300. In further implementations, the sign-up link may be displayed in the other content 208 (FIG. 2), in proximity to the video player region 300. The sign-up link or control 310 may be a link, button, selectable icon, or some other user-selectable user interface object. The sign-up link or control 310, when selected by a user, directs the user to a web page or some other user interface where the user can request a video advertising service. In some implementations, the video advertising service includes placement of an advertisement that is targeted to the displayed video. Further details regarding the sign-up link 310 are described below.

The control portion 306 includes controls for controlling playback of the video (e.g., play, pause, reverse, fast forward, volume, full screen, skipping, etc.). The control portion 306 also includes a scrubber or progress bar 312 and a playhead 320. The scrubber bar 312 represents the total length of the video. The playhead 320 indicates, by its position relative to the length of the scrubber bar 320, which frame of the video is being displayed at the moment.

The scrubber bar 312 may display one or more advertisement slots 314. In some implementations, the advertisement slots 314 are indicated as vertical bars in the scrubber bar 312, as shown in FIGS. 3A-3B. The advertisement slots 314 indicate positions in the video stream where video advertisements may be placed for display to a user. Further details regarding advertisement slots are described below.

In FIG. 3A, the playhead 320 indicates a position on the scrubber bar 312 not corresponding to an advertisement slot 314; the frame displayed in the video content display area 302 at the moment is a frame from the video and not from a placed video advertisement. In FIG. 3B, the playhead indicates a position on the scrubber bar 312 that corresponds to an advertisements slot 314; the frame displayed in the video content display area 302 at the moment is a frame from a placed video advertisement. While a video advertisement is displayed, an advertisement information portion 304 may be displayed. The advertisement information portion 304 may display the name of the advertiser or sponsor associated with the video advertisement being displayed and a link 318, which, when selected by a user, directs the user to a resource associated with the advertisement (e.g., a website of the advertiser or sponsor). The advertisement information portion 304 may also include a skip advertisement link or control 316. When the skip advertisement link 316 is selected by the user, the currently displayed video advertisement is skipped and playback continues from the first frame of the video after the skipped video advertisement (or, playback stops if the skipped video advertisement is located at the end of the video). In some implementations, the skip advertisement link or control 316 is a link. In some other implementations, the skip advertisement link or control 316 may be a button, selectable icon, or some other user-selectable user interface object.

Figure 4:
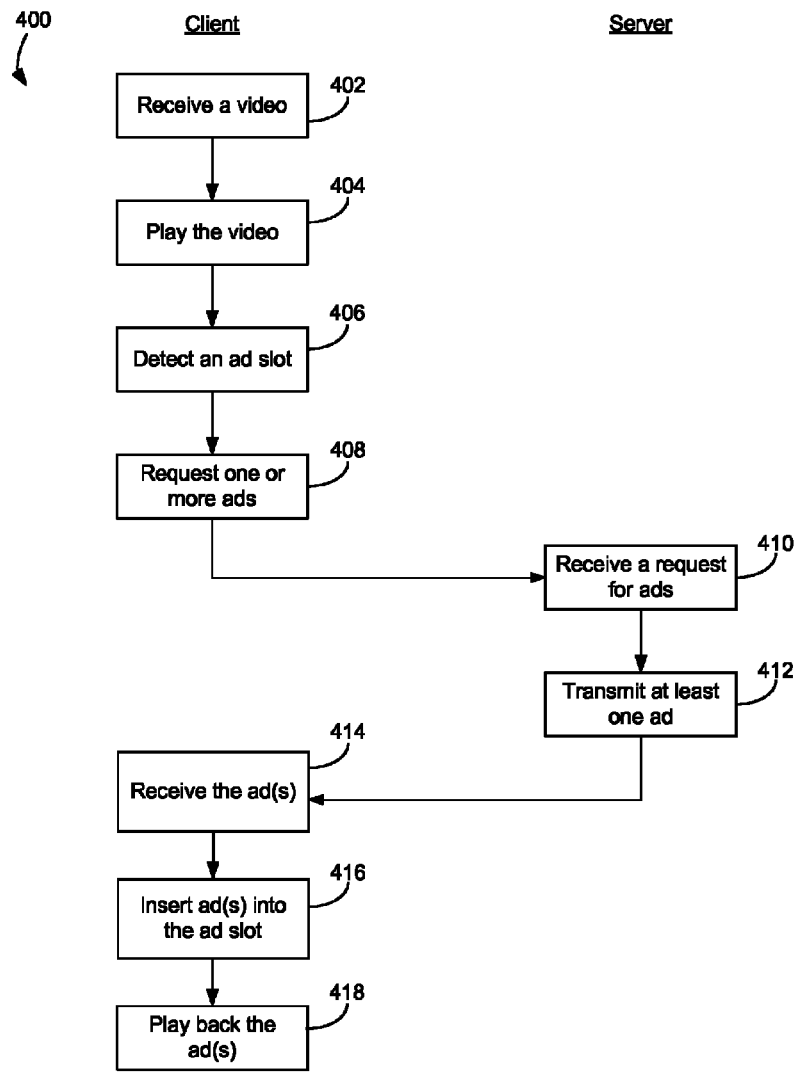
FIG. 4 is a flow diagram of a process for providing video advertisements in accordance with one implementation.

FIG. 4 is a flow diagram of a process flow 400 for providing video advertisements in accordance with one implementation. A video is received by a client (402). In some implementations, a video is received by a client from a publisher, after the client sends a request for the video to the publisher. The request may be sent by the client, in response to the client attempting to access the video. For example, the client may have loaded, at a user's command, a web page within a web browser application, where the web page has an embedded video, referred by its URL.

The video is played (404). The video may be played in a standalone video player module or in an embedded player module/plug-in. In an exemplary implementation, the video is played in a video player user interface in a web page, such as that described above with relation to FIGS. 2, 3A, and 3B. In some implementations, the video begins playing after the entire video is downloaded into memory (volatile and/or non-volatile) at the client. In some other implementations, the video is streamed to the client.

During the playback of the video, an impending advertisement slot in the video is detected (406). One or more video advertisements are requested (408). The video advertisements are requested for placement in the detected advertisement slot and for display to the user when playback of the video reaches the advertisement slot. In some implementations, the request merely asks for one or more advertisements, without requesting for any specific advertisement. In some other implementations, the request may ask for a specific advertisement. In an exemplary implementation, the request includes an identifier of the video (e.g., a video ID), metadata associated with the video, the position of the advertisement slot, and the length of the advertisement slot.

The request is received by a server (410). In some implementations, the server is a server within an ad aggregator. In some implementations, the server may identify the video for which the video advertisement is placed by a video ID included in the request. The identity of the video for which the video advertisement is used to track ad placements. The server may determine one or more video advertisements for placement based on any number of factors, including but not limited to the position of the advertisement slot, the length of the advertisement slot, metadata associated with the video, any categories with which the video is associated, etc.

At least one video advertisement is transmitted (412). In some implementations, the video advertisement(s) are transmitted from the publisher at the request of the ad aggregator. In some other implementations, the video advertisement(s) are transmitted by the ad aggregator. The video advertisement(s) is received by the client (414). The video advertisement(s) is placed in the advertisement slot within the video (416). When playback of the video reaches the advertisement slot, the video advertisement(s) are played back (418).

It should be appreciated that it may be possible that no advertisement is transmitted for an advertisement slot. For example, the ad aggregator may determine that no advertiser provided an advertisement for placement with the video. When playback of the video reaches the advertisement slot, the advertisement slot may be bypassed, and playback continues from the next portion of the video.

Advertisement Slots

As described above, a video may have one or more advertisement slots. An advertisement slot is a span of time in a video that is reserved for presenting video advertisements. In some implementations, an advertisement slot is akin to the well-known commercial break within or between television programs. An advertisement slot may be located anywhere in the video, including at the beginning (before the feature content of the video), in between portions of the video, or at the end (after the feature content of the video). A video may have one or more advertisement slots. An advertisement slot may be of any non-zero length. In an exemplary implementation, the length of an advertisement slot is thirty (30) seconds. In another exemplary implementation, the length of an advertisement slot is sixty (60) seconds. Furthermore, in some implementations, the advertisement slot has a maximum length and the total running time of the one or more video advertisements placed in a particular slot may be less than or equal to the maximum length of that slot.

In some implementations, one or more advertisement slots are added to a video by the creator of the video. That is, the creator of the video indicates the positions and lengths of the advertisement slots as part of the process of creating the video or as a subsequent modification to the video. In some other implementations, positions of advertisement slots are determined by automated processes.

Figure 5A:
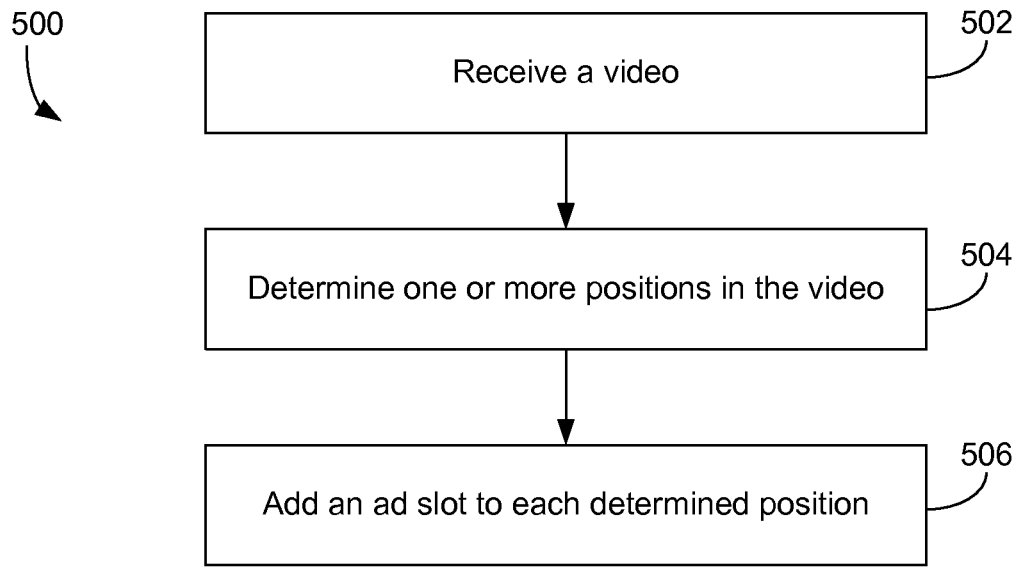
FIG. 5A is a flow diagram of a process for adding advertisement slots into a video in accordance with one implementation.

FIG. 5A is a flow diagram of a process flow 500 for adding advertisement slots into a video in accordance with one implementation. A video is received (502). In some implementations, a video is received from a creator of the video. The received video may or may not include any information regarding advertisement slots. In some other implementations, the video is received from the publisher where the video is stored. One or more positions in the video are determined (504). Positions may be determined by any of a number of automated processes, examples of which are further described below. An advertisement slot is added to the video at each determined position (506). In some implementations, advertisement slots are added to the video by associating metadata containing the positions and lengths of the advertisement slots with the video. When the video is loaded at a client 102 by a video player module that is configured to recognize the metadata, the video player module reads the metadata and identifies the advertisement slots. The video is divided at the determined positions, and the gaps between the divided portions of the video are the slots. The advertisement slots may add additional time to the total length of the video. Playback proceeds according to blocks 404-418 of process flow 400 (FIG. 4).

As described above, positions for advertisement slots may be determined by an automated process in block 504. In some implementations, an automated process for determining the slot positions determines which times in the video are the optimal times to interrupt the video and insert an advertisement slot. In some implementations, the determination is based on an analysis of the content of the video.

Figure 5B:
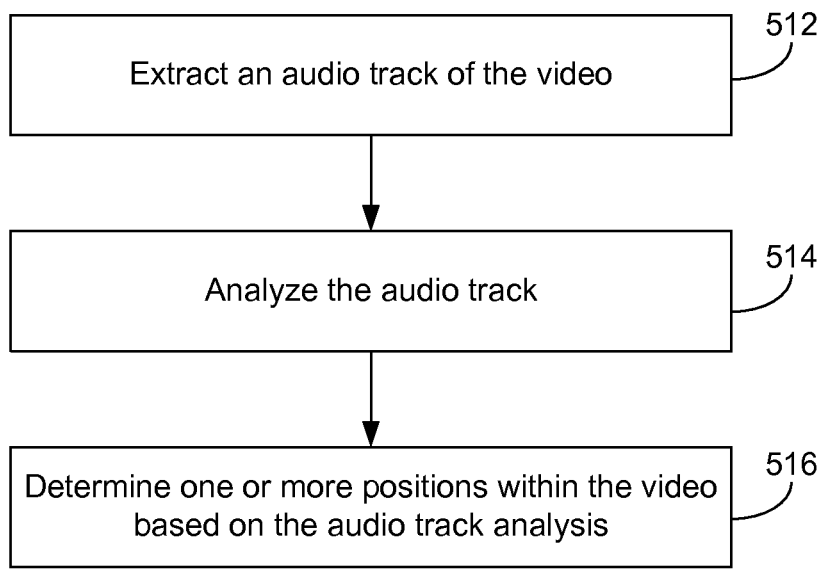
FIGS. 5B and 5C are flow diagrams of processes for determining positions for video advertisement slots in a video in accordance with one implementation.
Figure 5C:
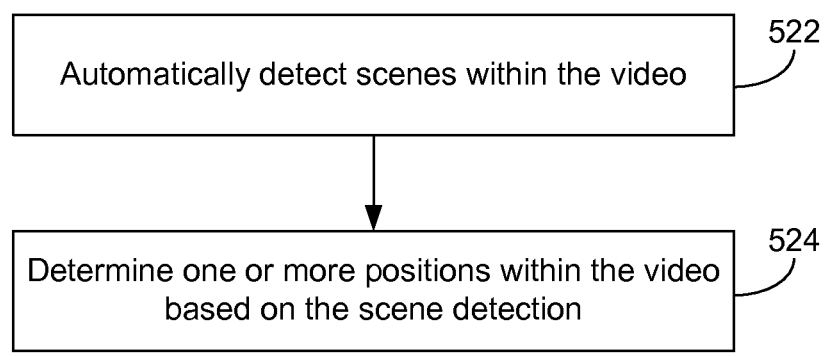

FIGS. 5B and 5C illustrate flow diagrams of processes for determining positions for video advertisement slots in a video in accordance with one implementation. In FIG. 5B, after a video is received in block 502 (FIG. 5A), an audio track of the video is extracted (512). The audio track is analyzed (514). One or more positions for advertisement slots are determined based on the analyzing (516). Slots are added for each determined position in accordance with block 506 (FIG. 5A). In some implementations, the analysis of the audio track identifies, based on the audio content of the video, positions that, if an advertisement slot is added, is less likely to be disruptive to the flow of the video. For example, the analysis may identify music that signals the beginning or end of an act or a scene or the beginning or end of an opening sequence or end credits, where an advertisement slot is less likely to be disruptive than if, for example, the advertisement slot is positioned in the middle of an act or a scene. In one exemplary implementation, the analysis includes computing an adaptive volume threshold from a window of preceding audio and identifying portions of the audio for which the volume is below the threshold for at least a specified amount of time. This technique is an adaptation of a technique disclosed in U.S. patent application Ser. No. 11/454,386, titled "Method and Apparatus for Automatically Summarizing Video," filed Jun. 15, 2006, which is hereby incorporated by reference herein.

In FIG. 5C, after a video is received in block 502 (FIG. 5A), one or more scenes in the video are detected automatically (522). One or more positions for advertisement slots are determined based on the detected scenes (524). The scene detection identifies, based on the visual content of the video, positions that, if an advertisement slot is added, is less likely to be disruptive to the flow of the video. For example, the end credits may be identified by detecting a scrolling list of names or lists of names, and an advertisement slot may be positioned right before the end credits begin. As another example, a transition between two scenes may be detected by a fade out effect followed by a fade in effect, and an advertisement slot may be positioned between the transitioning scenes. In one exemplary implementation, scene detection may be performed by detecting blank scenes and/or frame-to-frame changes to a large percentage (e.g., 75%) of the pixels on the screen. In another exemplary implementation, the above scene detection may be performed along with detecting, in the audio track, transitions or periods of silence longer than a specified time length. An exemplary technique for performing scene detection is disclosed in U.S. patent application Ser. No. 11/454,386, titled "Method and Apparatus for Automatically Summarizing Video," filed Jun. 15, 2006, mentioned and incorporated by reference above.

It should be appreciated that the automated processes for determining advertisement slot positions described above are merely exemplary. The processes described above and other processes for analyzing the content may be utilized individually or in combination to determine advertisement slot positions.

Placement and Targeting of Advertisements

The format of an advertisement, whether video, banner, text, etc, is but one aspect of an advertising campaign. Another aspect of an advertising campaign is the placement of the advertisement. Placement of advertisements is important because the proper placement increases the likelihood that the advertisement is exposed to someone who is interested in the advertisement, and thus more likely to act upon the advertisement.

Figure 6:
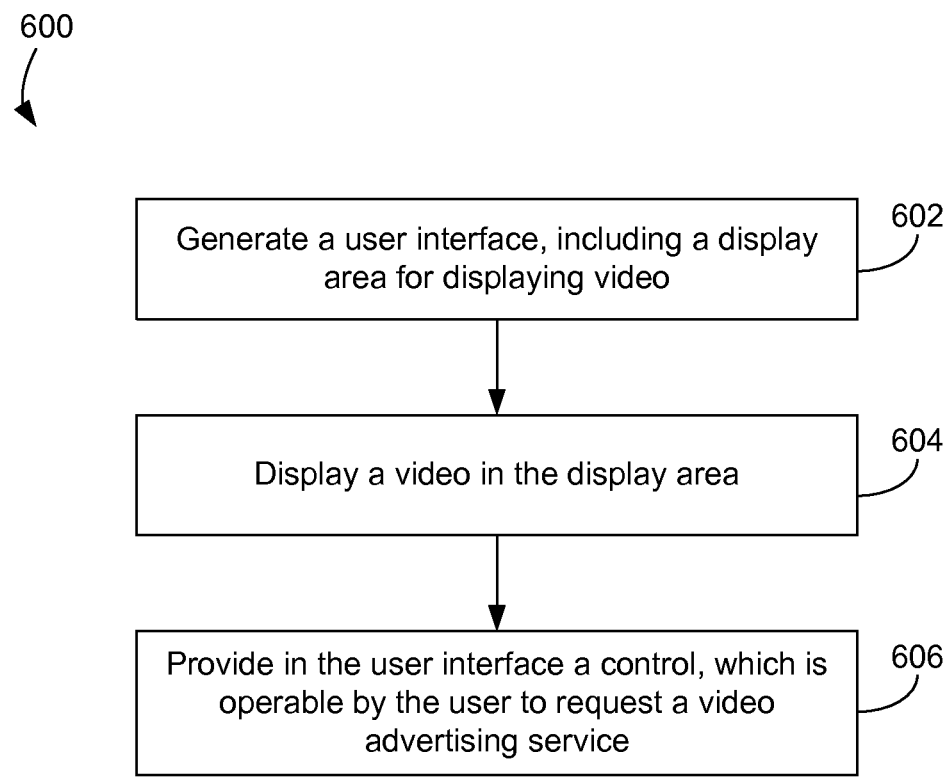
FIG. 6 is a flow diagram of a process for providing a control to a user in accordance with one implementation.

FIG. 6 is a flow diagram of a process flow 600 for providing a control to a user in accordance with one implementation. A user interface, including a display area for displaying a video, is generated (602). The user interface may be generated when a video is accessed for playback. The video is displayed in the display area (604). While the video is displayed, a control is provided (i.e., displayed) in the user interface (606). The control is operable by the user to request a video advertising service. In some implementations, the control is the sign-up link or control 310 (FIGS. 3A-3B).

The user (and potential advertiser) may select the control (e.g., by clicking on it). In response, the user is directed to a sign-up user interface, such as an online form in a web page, where the user may request a video advertising service. In some implementations, the video advertisement service includes placement of an advertisement with a video. To request the placement, a user may make the request in the sign-up user interface. At the user interface, the user provides his information and provides an advertisement to be placed with the video. In some implementations, the sign-up user interface is provided by the ad aggregator 106, and information submitted from the sign-up user interface is stored in the ad aggregator 106. The provided advertisement may be displayed whenever the video is displayed.

The advertisement provided by the user may be a video advertisement. The video advertisement may be provided for placement in an advertisement slot in a video. When playback of the video reaches the advertisement slot, the inserted video advertisement is played back.

In some implementations, where a video advertisement may be placed in a video may be determined by an auction format, similar to that used in the ADSENSE and ADWORDS programs by Google, Inc. (Mountain View, Calif.). For example, the bidding may determine the order in which the video advertisements are placed in a video; video advertisements associated with higher bids may be placed in advertisement slots that are earlier in the video. At the sign-up page described above, the user may place a bid for placing the video advertisement in a video.

In some implementations, the user may request placement of an advertisement at a particular point in the video. As the user and potential advertiser is viewing a video, he may decide that he wishes to place an advertisement for display at a particular time or at a particular advertisement slot in the video. The user may select the sign-up control 310 at that particular time or slot. In one implementation, at the sign-up user interface, the user may elect to insert the provided advertisement into the particular time or advertisement slot at which the user selected the sign-up control 310 or into the advertisement slot nearest in time to when the user selected the sign-up control 310. In another implementation, the user bids to have the provided advertisement placed in the particular time or slot.

In some implementations, the user may provide an advertisement to be placed not only with one particular video, but also with other videos that are related to or in the same category or channel as the video for which the user selected the sign-up control 310. In some implementations, two videos are related if both include one or more common keywords in their title or description or associated metadata and/or include one or more common tags or labels. The sign-up user interface may offer the user the option to place the advertisement with the video during which the sign-up control was selected, or with that video and related videos.

Videos may be grouped by categories or channels. A category or channel may be a group of two or more videos that are related based on their content. A category or channel may express a concept or topic relevant to the content of a video. For example, videos of home runs in baseball games may be grouped into a "sports" category, a "baseball" category, or perhaps even a "baseball" sub-category within a "sports" category. An advertiser or sponsor may target one or more advertisements to any number of categories. An advertisement targeted to a category may be placed with videos in that category. If the advertisement is a video advertisement, the video advertisement may be placed in advertisement slots in videos in that category for playback. In some other implementations, a video advertisement may be targeted based on other criteria in addition to or instead of categories or related videos, such as geographic region, demographics, the website in which the video is embedded, or the identity of the user accessing the video.

In some implementations, an ad aggregator and/or a publisher may provide a network-based video creation tool for enabling potential advertisers or sponsors to create targeted advertising campaigns. In an exemplary implementation, the video creation tool is implemented in a web-based interface (i.e., one or more web pages). The web-based interface may be presented to an advertiser, allowing the advertiser to provide or create an in-stream video advertisement. The interface may provide the advertiser an option to input URL's of particular videos to target or to select categories of videos or particular websites for targeting. If the advertiser selects a category or website for targeting, the tool may present to the user a list of videos in the category or website. For example, a list of URL's of videos with properties of the videos (e.g., length, a sample frame from the video) may be presented to the advertiser. The advertiser may select the entire category or website, or particular videos in the category or website, for targeting.

In some implementations, the advertiser may place a video advertisement using a "run of network" model. In run-of-network advertising, the advertiser gives up its control over the placement of advertisements in return for lower rates and broader reach to targeted markets. In one implementation, video advertisements may be placed with videos in any number of sites within a network of websites. A run-of-network advertising placement is similar to a run-of-site advertising placement, except that the advertisements appear on more than one site instead of an individual site.

Figure 7A:
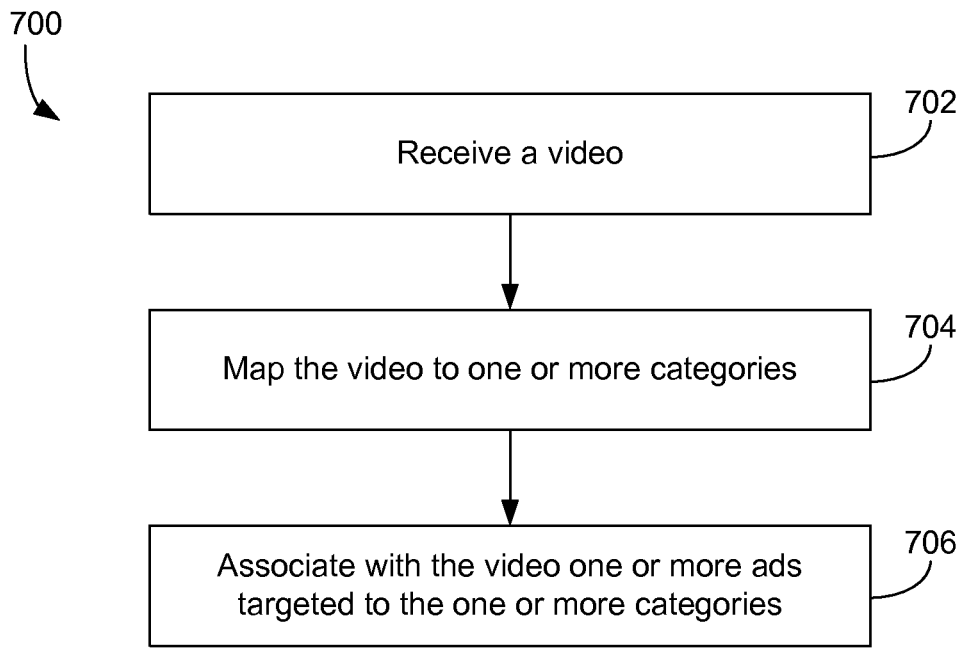
FIG. 7A is a flow diagram of a process for mapping a video to one or more categories and associating the video to advertisements targeting those categories in accordance with one implementation.

FIG. 7A is a flow diagram of a process flow 700 for mapping a video to one or more categories and associating the video to advertisements targeting those categories in accordance with one implementation. A video is received (702). The video is mapped to one or more categories (704). One or more advertisements that are targeted to the one or more categories are associated with the video (706). The advertisements, which may include video advertisements, may be placed with the video.

Videos may be mapped into categories or channels for targeting purposes in any of a number of ways. In one implementation, the creator of a video specifies one or more categories for the video manually. For example, as part of the process of providing a video to a publisher, the creator of the video may be asked to provide one or more categories for the video. The provided categories may be stored in metadata associated with the video. When the video is loaded for playback by a video player module, the category data in the video metadata is read. When advertisements are requested in block 408 (FIG. 4), advertisements in the category or categories specified by the metadata may be requested.

Figure 7B:
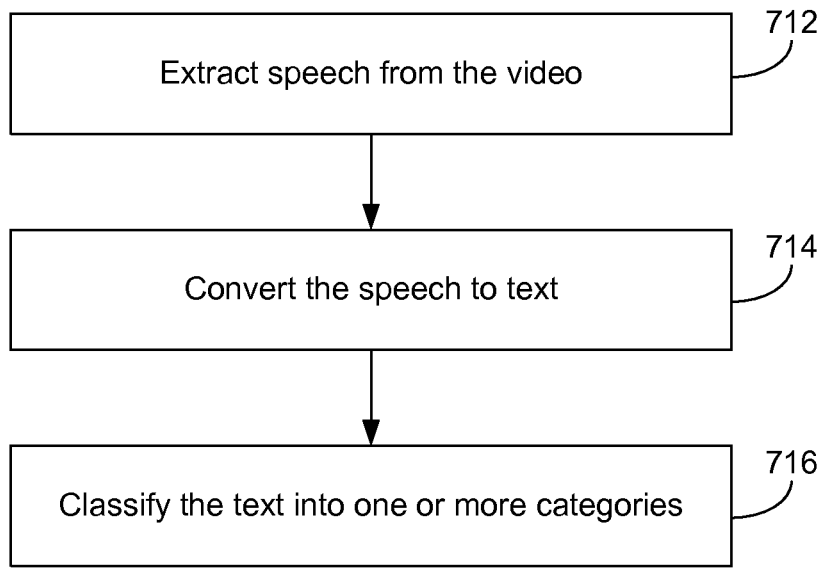
FIG. 7B is a flow diagram of a process for classifying speech in video into one or more categories in accordance with one implementation.

In some implementations, a video may be mapped to one or more categories based on its content. In some implementations, the video may be mapped to a category based on speech in the video. FIG. 7B is a flow diagram of a process for classifying speech in video into one or more categories in accordance with one implementation.

The speech in the video is extracted (712). The speech is the portion(s) of the audio track of the video other than music and sound effects. The speech of the video may include spoken dialogue, narration, and/or sung song lyrics. The speech is converted to text (714).

The speech is converted to text using automated speech recognition techniques that are well known in the art. An exemplary speech recognition technique is disclosed in Kai-Fu Lee, "Automatic Speech Recognition—The Development of the SPHINX System," Kluwer Academic Publishers, Norwell, Mass., 1989; and in U.S. application Ser. No. 11/241,834, titled, "Using Speech Recognition to Determine Advertisements Relevant to Audio Content and/or Audio Content Relevant to Advertisements," filed Sep. 30, 2005, which are hereby incorporated by reference herein. The text is classified into one or more categories (716). Any of a number of well-known techniques may be used to classify the converted text into one or more categories. For example, the text may be used by a text or document classifier to classify the video into categories using a clustering algorithm. An exemplary classification technique using a clustering algorithm is described in U.S. Patent Application Publication No. U.S. 2004/0068697 A1, titled "Method and Apparatus for Characterizing Documents Based on Clusters of Related Words", filed Sep. 30, 2003, which is hereby incorporated by reference herein.

In another implementation, the video includes subtitle or closed caption data. In this case, the speech in the video may be identified from the subtitle or closed caption data rather than from speech recognition applied to the audio content of the video. Classification techniques, such as those described above, may be applied to the subtitles or closed captions text to map the video into one or more categories.

It should be appreciated that classification of the speech of a video into categories is merely one exemplary way of categorizing videos. Other ways include, without limitation, classifying based on the content of the website in which the video is embedded and optical content or object recognition. In one implementation, videos may include metadata regarding their content. The videos may be mapped into categories by classifying the video metadata using a clustering algorithm as described above.

Using Advertisement Interaction Data

When a video advertisement is displayed to users, respective users may interact with the video advertisement differently. Some may skip it as soon as it begins playing or even before it begins playing. Some may skip it after it plays for a number of seconds. Some may let it play back in its entirety. Data regarding such interactions may be used to affect the placement of video advertisements.

Figure 8:
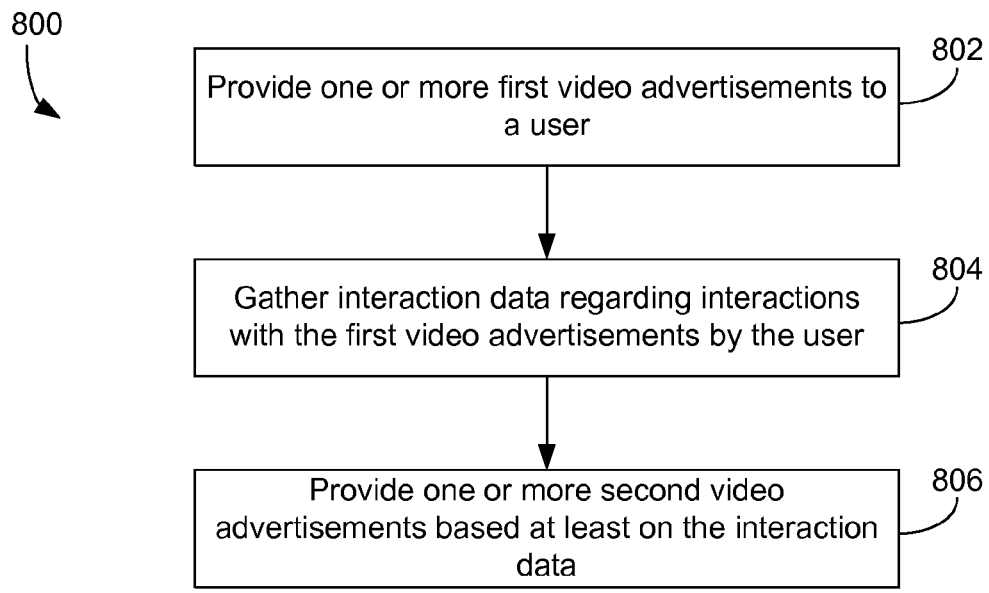
FIG. 8 is a flow diagram of a process for providing advertisements based on user interaction data in accordance with one implementation.

FIG. 8 is a flow diagram of a process flow 800 for providing video advertisements based on user interaction data. One or more first video advertisements are provided (displayed) to a user (802). The video advertisements may be displayed to the user as described above. When a video advertisement is displayed (i.e., playback started), the user may skip it by selecting a skip ad control, such as the skip ad control 316. Interaction data regarding the user's interaction with the first video advertisements are gathered (804). Skips and viewing or playback durations of the first video advertisements are recorded and stored. In one implementation, skips of video advertisements by manually moving the playhead 320 past an advertisement slot position are also recorded and stored.

The interaction data includes whether a video advertisement was skipped by the user and how much of the advertisement was played before the user skipped it, i.e. the viewing or playback duration. In some implementations, the interaction data may be gathered in the aggregate and associated with the respective advertisements. An advertisement may accumulate interaction statistics that are associated with the advertisement but not associated with a particular individual user, such as the number of skips, the number of skips as a percentage of number of times the ad was placed (the skip rate), viewing or playback durations, and average viewing/playback duration. In some other implementations, besides the aggregate statistics associated with a video advertisement, interaction statistics may be gathered for and associated with particular users. In some implementations, the aggregate statistics may be presented to the respective advertiser or sponsor. For example, the viewing durations of placements of the ad may be presented in a histogram.

One or more second video advertisements are provided to the user based at least on the interaction data (806). The second video advertisements that are presented, which may include none, some, or all of the first video advertisements, may be chosen based at least in part on the interaction data.

For example, if a user constantly skips a particular video advertisement, that video advertisement, or even other video advertisements that are related to that video advertisement (e.g., same category, same sponsor, etc.), may be less likely to be chosen for placement for display to the user. Likewise, if the video advertisement is skipped by many users, the video advertisement or other related video advertisements may be less likely to be placed for display to users. As another example, if the average viewing duration of a video advertisement is below a threshold or the average viewing durations of other related video advertisements, the ad may be less likely to be placed. On the other hand, if the user does not skip a particular video advertisement often (e.g., watch it in its entirety for the majority of the placements of the video advertisement for display to the user), then the video advertisement may become more likely to be placed for display to the user.

More generally, the process of providing advertisements based on user interaction data includes presenting a first set of one or more video advertisements, gathering data regarding interactions with the first set of advertisements, and based on the interaction data, present a second set of one or more video advertisements. The first and second sets may or may not include video advertisements in common. Also, the users to which the first and second sets are presented may be the same or different. In one implementation, the first set of video ads are presented to one or more users. Data regarding the users' interactions are gathered, and based on the interaction data, a second set of video ads are presented to the same users. In another implementation, the first set of video ads are presented to a first set of one or more users. Data regarding the first set of users' interactions are gathered. Based on the interaction data with respect to the first set of users, a second set of video ads are presented to a second set of one or more users.

Figure 9:
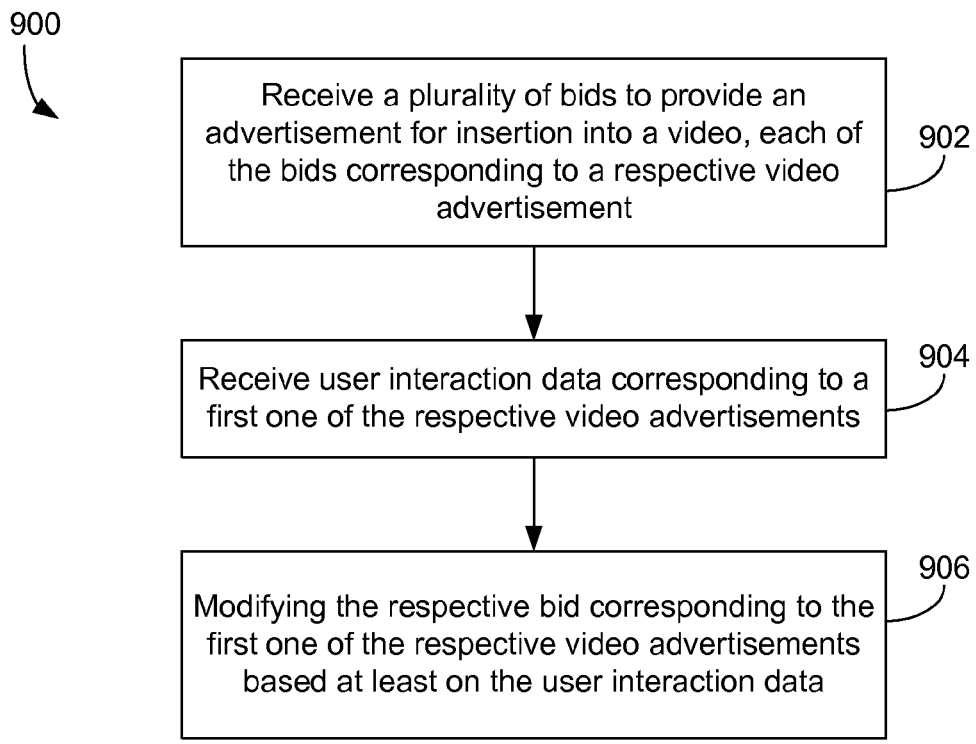
FIG. 9 is a flow diagram of a process for modifying a video advertisement bid based on user interaction data with the video advertisement in accordance with one implementation.

In some implementations, ads with poor interaction statistics (e.g., high skip rate, low average viewing duration) may be penalized by having their bids modified. FIG. 9 is a flow diagram of a process flow 900 for modifying a video advertisement bid based on user interaction data with the video advertisement.

A plurality of bids to provide an advertisement for placement in a video, each bid corresponding to a respective video advertisement, is received (902). As described above, the placement of video advertisements with videos may be based on bids placed by advertisers. User interaction data corresponding with a first one of the ads is received (904). The interaction data may include the skip rate and average viewing duration of the ad. The bid for that first one of the ads is modified based on the interaction data (906). In some implementations, the bid is lowered if the interaction data for the ad is "poor," or of low quality, e.g., low average viewing duration or high skip rate. By lowering the bid, other ads with higher bids are more likely to be placed ahead of the ad whose bid was modified. In some implementations, a bid may be increased if the interaction data for the ad is "good" or of high quality, e.g., low skip rate or high average viewing duration.

It is well known in the art that online advertisement placements may be priced and bid upon based on impressions or click-throughs. In some implementations, the pricing and bidding of video advertisement placements may be based at least in part on whether the video advertisement was played and/or how long it was played. For example, one pricing model is cost per play, where an advertiser pays for video advertisements placements that are not skipped and bids based on the amount he will pay per un-skipped video advertisement placement. In some implementations, the price or bid for placing a video advertisement may be a combination of cost per play and cost per impression, or of cost per play and cost per click-through. For purposes of pricing and bidding, whether an ad is considered skipped may vary depending on the particular implementation. In an exemplary implementation, a video advertisement is considered skipped if it was not played back in its entirety. That is, the video advertisement must be played all the way through, or else it is considered as skipped. In another exemplary implementation, a video advertisement is considered skipped if the viewing duration is below a specified threshold (e.g., an absolute threshold, such as 5 seconds; or a relative threshold, such as 75% of the total length of the ad). A placement of an video advertisement whose viewing duration meets or exceeds the threshold is considered as un-skipped or as a "quality view" and the advertiser is charged for the placement. In another implementation, the cost per play may be a linear or non-linear function of the viewing duration. For example, the advertiser may be charged higher for a longer playing duration and charged less for a shorter duration.

Figure 10:
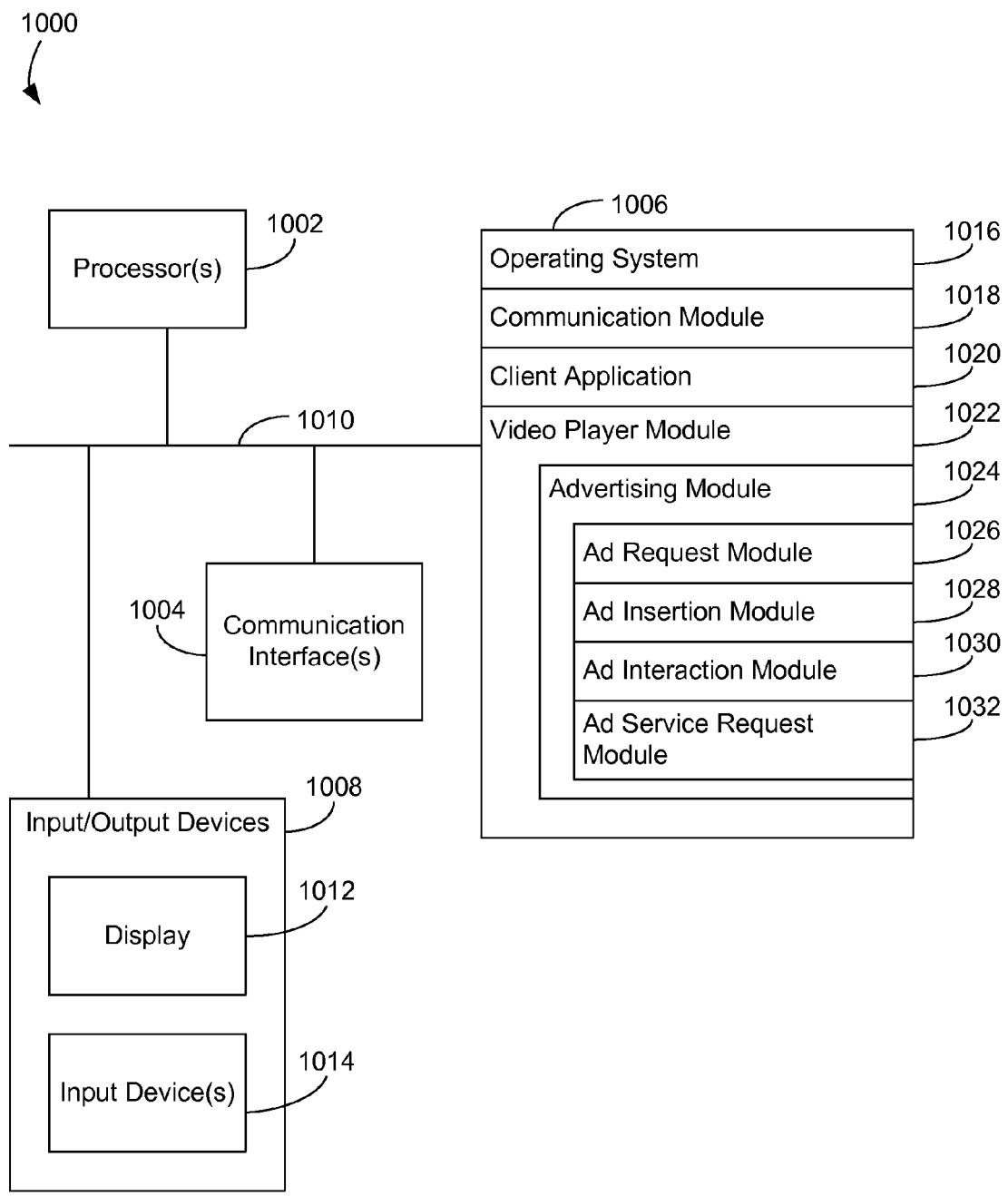
FIG. 10 is a block diagram of a client computer in accordance with one implementation.

FIG. 10 is a block diagram of a client computer in accordance with one implementation. The client computer 1000 includes one or more processors 1002, one or more communication interfaces 1004, memory 1006, input and output devices 1008, and a data bus 1010 for interconnecting these components. The communication interface(s) 1004 connects the client computer to one or more networks of computers such as local area networks (LANs), wide area networks (WANs), wireless networks, and the Internet. The input and output devices 1008 may include output devices such as a display monitor 1012 and input devices 1014 such as a keyboard and a mouse. Memory 1006 may include volatile memory, such as DRAM, SRAM, DDR RAM, etc.; as well as non-volatile memory, such as hard disk drives, optical disk drives, and magnetic tape drives, and flash memory. Memory 1006 may also include storage that is remote from the processor(s) 1002, such as network-attached storage.

Memory 1006 may store the following modules or sets of instructions, or subsets or supersets thereof: an operating system 1016 for performing system functions and hardware-dependent tasks; a communication module 1018 for communicating with other computers or devices through one or more computer networks such as local area networks, wide area networks, the Internet, etc.; a client application 1020, such as a web browser, for accessing content; and a video player module 1022 for playing video.

The video player module 1022 may include an advertising module 1024. The advertising module 1024 includes an ad request module 1026 for requesting advertisements, such as video advertisements, for placement; an ad insertion module 1028 for inserting video advertisements into advertisement slots of videos; an ad interaction module 1030 for monitoring and gathering statistics of interactions with video advertisements such as skips and viewing durations; and an ad service request module 1032 for providing a sign-up control to and directing users who select the control to a user interface for requesting a video advertising service.

Figure 11:
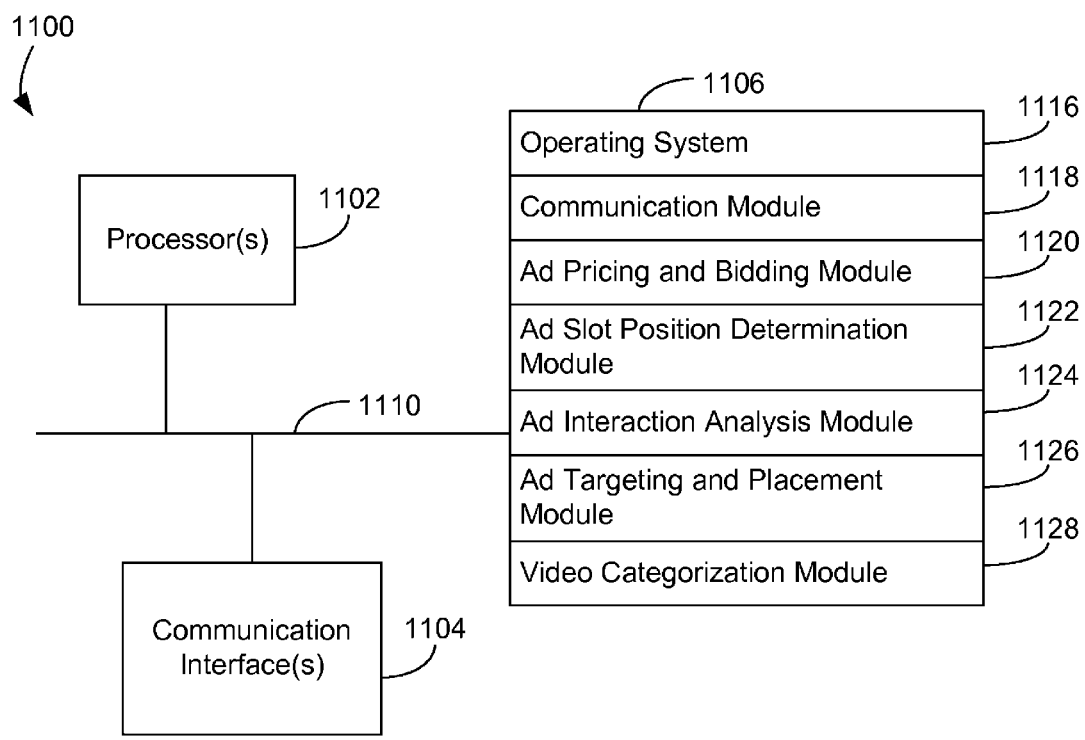
FIG. 11 is a block diagram of a server computer in an ad aggregator in accordance with one implementation.

FIG. 11 is a block diagram of a server computer in an ad aggregator in accordance with one implementation. The server computer 1100 includes one or more processors 1102, one or more communication interfaces 1004, memory 1006, and a data bus 1010 for interconnecting these components. The communication interface(s) 1104 connects the client computer to one or more networks of computers such as local area networks (LANs), wide area networks (WANs), wireless networks, and the Internet. Memory 1106 may include volatile memory, such as DRAM, SRAM, DDR RAM, etc.; as well as non-volatile memory, such as hard disk drives, optical disk drives, and magnetic tape drives, and flash memory. Memory 1106 may also include storage that is remote from the processor(s) 1102, such as network-attached storage.

Memory 1106 may store the following modules or sets of instructions, or subsets or supersets thereof: an operating system 1116 for performing system functions and hardware-dependent tasks; a communication module 1118 for communicating with other computers or devices through one or more computer networks such as local area networks, wide area networks, the Internet, etc.; an ad pricing and bidding module 1120 for providing tools for advertisers to bid for advertisement placements, for adjusting bids based on advertisement interaction data, and for facilitating pricing and bidding of video advertisements based on the number or quality of plays, or a combination of plays and either impressions or click-throughs; an ad slot position determination module 1122 for determining positions of advertisement slots in video advertisements and storing the determined positions in metadata; an ad interaction analysis module 1124 for analyzing interaction data associated with video advertisements and/or users and targeting advertisements based on the analyzing; an ad targeting and placement module 1126 for targeting and placements advertisements based on categories or a run-of-network model; and a video categorization module 1128 for mapping videos to categories.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A computer-implemented method, comprising:
receiving, from a plurality of advertisers and by a data processing apparatus, a plurality of bids corresponding to video advertisements that are available for insertion into a video, each of the plurality of bids corresponding to a respective video advertisement, and the bids being values with which advertisements are selected for insertion into the video;
for each video advertisement:
receiving user interaction statistics of the video advertisement, wherein the user interaction statistics quantify previous user interactions of multiple, different users with the video advertisement and wherein the user interaction statistics include a skip rate for the video advertisement; and
modifying, by a data processing apparatus, the received bid corresponding to the video advertisement based on the received user interaction statistics, the bid corresponding to the video advertisement being decreased when the user interaction statistics quantify previous user interactions that meets a first advertisement skip rate specifying a first rate at which the video advertisement is skipped, and the bid corresponding to the video advertisement being increased when the user interaction statistics quantify previous user interactions that do not meet a second advertisement skip rate specifying a second rate at which the video advertisement is skipped, the second rate being less than the first rate, wherein a particular video advertisement inserted in the video is determined to be skipped in response to a user causing playback of the video to continue without the viewing duration meeting a specified threshold for the particular advertisement that is less than all of the particular video advertisement being presented;
selecting, by a data processing apparatus, one or more video advertisements for insertion into the video, each of the one or more video advertisements being selected based on the modified bid corresponding to the video advertisement; and for each of the selected one or more video advertisements, computing a price to charge the advertiser for insertion of the selected video advertisement into the video, the price being computed based at least in part on the modified bid corresponding to the selected video advertisement and an actual viewing duration for the selected video advertisement inserted into the video, the price being charged in response to the actual viewing duration meeting at least the specified threshold for the advertisement.

2. The method of claim 1, wherein for each video advertisement, the corresponding user interaction statistics comprise viewing duration data associated with the video advertisement.

3. The method of claim 1, wherein for each video advertisement, the corresponding user interaction statistics comprise data specifying viewing durations for previous user interactions with the video advertisement.

4. The method of claim 1, wherein for each video advertisement, the price that the advertiser is charged is further computed based on a cost per play and a cost per impression of the video advertisement.

5. The method of claim 1, wherein for each video advertisement, the price that the advertiser is charged is further computed based on a cost per play and a cost per click-through of the video advertisement.

6. The method of claim 1, wherein each bid is for insertion of the corresponding video advertisement into the video at an advertiser specified time slot in the video.

7. A computer-implemented method comprising:
receiving, from a plurality of advertisers and by a data processing apparatus, a plurality of bids corresponding to video advertisements that are available for insertion into a video, each of the plurality of bids corresponding to a respective video advertisement, and the bids being values with which advertisements are selected for insertion into the video;
for each video advertisement:
receiving user interaction statistics of the video advertisement, wherein the user interaction statistics quantify previous user interactions with the video advertisement and wherein the user interaction statistics include a skip rate for the video advertisement; and
modifying, by a data processing apparatus, the received bid corresponding to the video advertisement based on the received user interaction statistics, the bid corresponding to the video advertisement being decreased when the user interaction statistics quantify previous user interactions that meets a first advertisement skip rate specifying a first rate at which the video advertisement is skipped, and the bid corresponding to the video advertisement being increased when the user interaction statistics quantify previous user interactions that do not meet a second advertisement skip rate specifying a second rate at which the video advertisement is skipped, the second rate being less than the first rate, wherein a particular video advertisement inserted in the video is determined to be skipped in response to a user causing playback of the video to continue without the viewing duration meeting a specified threshold for the particular advertisement that is less than all of the particular video advertisement being presented;
selecting, by a data processing apparatus, one or more video advertisements for insertion into the video, each of the one or more video advertisements being selected based on the modified bid corresponding to the video advertisement;
for each of the selected one or more video advertisements, computing a price to charge the advertiser for insertion of the selected video advertisement into the video, the price being computed based on the modified bid corresponding to the selected video advertisement and an actual viewing duration for the selected video advertisement inserted into the video, the price being charged in response to the actual viewing duration meeting at least the specified threshold for the advertisement; and
wherein the video is associated with a plurality of advertisement slots indicating locations in the video where video advertisements can be inserted, the method further comprising: determining an order for insertion of the selected video advertisements into the advertisement slots of the video based on the respective bids of the video advertisements, wherein video advertisements associated with a first group of bids are placed in a first set of advertisement slots in the video and advertisements associated with bids lower than the first group of bids are placed in advertisement slots in the video that are later in time than the first set of advertisement slots.

8. A non-transitory computer-readable medium having stored thereon instructions, which, when executed by a processor, causes the processor to perform operations including:
receiving a plurality of bids to provide video advertisements for insertion into a video, each of the plurality of bids corresponding to a respective video advertisement that is available for insertion into a video, wherein the bids are values with which advertisements are selected for insertion into the video;
for each video advertisement:
receiving user interaction statistics of video advertisement, wherein the user interaction statistics quantify past user interaction of multiple, different users with the video advertisement and wherein the user interaction statistics include a skip rate for the video advertisement; and
modifying the received bid corresponding to the video advertisement based on the received user interaction statistics, the bid corresponding to the video advertisement being decreased when the user interaction statistics quantify previous user interactions that meets a first advertisement skip rate specifying a first rate at which the video advertisement is skipped, and the bid corresponding to the advertisement being increased when the user interaction statistics quantify previous user interactions that do not meet a second advertisement skip rate specifying a second rate at which the video advertisement is skipped, the second rate being less than the first rate, wherein a particular video advertisement inserted in the video is determined to be skipped in response to a user causing playback of the video to continue without the viewing duration meeting a specified threshold for the particular advertisement that is less than all of the particular video advertisement being presented;
selecting one or more video advertisements for insertion into the video, each of the one or more video advertisements being selected based on the modified bids corresponding to the one or more video advertisements; and for each of the selected one or more video advertisements, computing a price to charge the advertiser for insertion of the selected video advertisement into the video, the price being computed based at least in part on the modified bid corresponding to the selected video advertisement and an actual viewing duration for the selected video advertisement inserted into the video, the price being charged in response to the actual viewing duration meeting at least the specified threshold for the advertisement.

9. The computer-readable medium of claim 8, wherein for each video advertisement, the corresponding user interaction statistics comprise viewing duration data associated with the video advertisement.

10. The computer-readable medium of claim 8, wherein for each video advertisement, the corresponding user interaction statistics comprise data specifying viewing durations for previous user interactions with the video advertisement.

11. The computer-readable medium of claim 8, wherein each bid is for insertion of the corresponding video advertisement into the video at an advertiser specified time slot in the video.

12. A system, comprising:
one or more data processors; and
instructions stored on a computer storage apparatus that when executed by the one or more data processors cause the one or more data processors to perform operations comprising:
receiving a plurality of bids corresponding to video advertisements that are available for insertion into a video, each of the plurality of bids corresponding to a respective video advertisement, bids being values with which advertisements are selected for insertion into the video;
receiving user interaction statistics of each video advertisement,
wherein the user interaction statistics quantify past user interaction of multiple, different users with the video advertisement and wherein the user interaction statistics include a skip rate for the video advertisement;
modifying a bid comprising:
decreasing the bid corresponding to each video advertisement for which corresponding user interaction statistics quantify previous user interactions that meets a first advertisement skip rate specifying a first rate at which the video advertisement is skipped, and
increasing the bid corresponding to each video advertisement for which corresponding user interaction statistics quantify previous user interactions that do not meet a second advertisement skip rate specifying a second rate at which the video advertisement is skipped, the second rate being less than the first rate, wherein a particular video advertisement inserted in the video is determined to be skipped in response to a user causing playback of the video to continue without the viewing duration meeting a specified threshold for the particular advertisement that is less than all of the particular video advertisement being presented;
selecting one or more video advertisements for insertion into the video, each of the one or more video advertisements being selected based on the increased and decreased bids corresponding to the one or more video advertisements; and
for each of the selected one or more video advertisements, computing a price to charge the advertiser for insertion of the selected video advertisement into the video, the price being computed based at least in part on the modified bid corresponding to the selected video advertisement and an actual viewing duration for the selected video advertisement inserted into the video, the price being charged in response to the actual viewing duration meeting at least the specified threshold for the advertisement.

13. The system of claim 12, wherein for each video advertisement, the corresponding user interaction statistics comprise viewing duration data associated with the video advertisement.

14. The system of claim 12, wherein for each video advertisement, the corresponding user interaction statistics comprise data specifying viewing durations for previous user interactions with the video advertisement.

15. The system of claim 12, wherein the price for each of the one or more selected video advertisements is further computed based at least on a cost per play and a cost per impression of the video advertisement.

16. The system of claim 12, wherein the price for each of the one or more selected video advertisements is further computed based on a cost per play and a cost per click-through of the video advertisement.

17. The system of claim 12, wherein each bid is for insertion of the corresponding video advertisement into the video at an advertiser specified time slot in the video.

\* \* \* \* \*

UNITED STATES PATENT AND TRADEMARK OFFICE
CERTIFICATE OF CORRECTION

PATENT NO.        : 8,719,865 B2
APPLICATION NO.   : 13/111857
DATED             : May 6, 2014
INVENTOR(S)       : Rajas Moonka et al.

Page 1 of 1

It is certified that error appears in the above-identified patent and that said Letters Patent is hereby corrected as shown below:

Title Page 3, Other Publications:

Column 2, Line 38 – delete "Tretived" and insert -- Retrieved --, therefor.

Column 2, Line 38 – delete "Retrived" and insert -- Retrieved --, therefor.

Signed and Sealed this
Nineteenth Day of August, 2014

Michelle K. Lee
*Deputy Director of the United States Patent and Trademark Office*